United States Patent [19]

Kato et al.

[11] Patent Number: 4,875,033

[45] Date of Patent: Oct. 17, 1989

[54] GRAPHICS INPUT APPARATUS

[75] Inventors: Kiyotaka Kato; Michitaka Oshima, both of Hyogo, Japan

[73] Assignee: Mitsubishi Denki Kabushiki Kaisha, Tokyo, Japan

[21] Appl. No.: 57,032

[22] Filed: Jun. 2, 1987

[30] Foreign Application Priority Data

Jun. 5, 1986 [JP] Japan .................................. 61-129197
Jun. 5, 1986 [JP] Japan .................................. 61-129198

[51] Int. Cl.$^4$ .............................................. G09G 1/00
[52] U.S. Cl. ..................................... 340/706; 340/709
[58] Field of Search ............... 340/709, 706, 710, 723, 340/728, 729; 364/188, 190, 480, 505, 512, 518, 521, 522; 178/18

[56] References Cited

U.S. PATENT DOCUMENTS 4,620,287 10/1986 Yam ..................................... 340/728

OTHER PUBLICATIONS

"Understanding Orthographic Views by Retrieving Consistent Interpretation of Faces", Journal of the Institute of Information Processing, vol. 85-CAD-17, pp. 1-8.
Japanese Patent Public Disclosure No. 3,287/86 Official Gazette.
"System for Inputting Product Information from Handwritten Orthographic Views" (No. 839) by Iwata et al., Transaction of the Japanese Society of Precision Engineering,—85 Autumn Scientific Lecture Meeting, Oct. 15, 1985, separate vol. 3 pp. 865–868.
IBM Tech. Disc. Bulletin, A. Appel et al., vol. 14, No. 7, Dec. 1987, pp. 2037–2045.
"Recognition of Machine Drawing" (No. 838) by Honda et al.

Primary Examiner—David K. Moore
Assistant Examiner—Jeffery A. Brier
Attorney, Agent, or Firm—Wolf, Greenfield & Sacks

[57] ABSTRACT

The graphics input apparatus enables an operator to input a two or three-dimensional schematic figure into a computer simply by hand-writing a two-dimensioanl figure in a picture plane of a display device such as a cathode ray tube. The graphics input apparatus is provided with a display device, a memory, a position indicator for indicating predetermined positions in the picture plane of the display device, and a cursor display for displaying a cursor at the position indicated by the position indicator. Element inputting means displays a starting point at the indicated position of the cursor, assigning a specified node number to a node in the vicinity of the starting node if the node has not been specifically numbered, storing the node number in memory, displaying the elements at the position to which the cursor is moved by the position indicator, further displaying an ending point, assigning a specified node number to a node in the vicinity of the ending point if the node is not already numbered, storing the node number of the nodes in the vicinity of the ending point and making the memory store information on connection between the starting point and the ending point. Shape recognition means recognizes the shape of the elements in a predetermined manner.

27 Claims, 17 Drawing Sheets

Fig. 4

| | | |
|---|---|---|
| dn 1 | X 1 | Y 1 |
| dn 2 | X 2 | Y 2 |
| dn 3 | X 3 | Y 3 |
| dn 4 | X 4 | Y 4 |
| dn 5 | X 5 | Y 5 |
| dn 6 | X 6 | Y 6 |
| dn 7 | X 7 | Y 7 |
| dn 8 | X 8 | Y 8 |
| dn 9 | X 9 | Y 9 |
| dn 10 | X 10 | Y 10 |
| dn 11 | X 11 | Y 11 |
| dn 12 | X 12 | Y 12 |
| dn 13 | X 13 | Y 13 |
| dn 14 | X 14 | Y 14 |
| dn 15 | X 15 | Y 15 |
| dn 16 | X 16 | Y 16 |
| dn 17 | X 17 | Y 17 |
| dn 18 | X 18 | Y 18 |
| dn 19 | X 19 | Y 19 |

INPUT A DIMENSION OF A RADIUS

GRAPHICS INPUT APPARATUS

BACKGROUND OF THE INVENTION

1. Field of the Invention

The present invention relates to a graphics input apparatus for interactively inputting data representing two- or three-dimensional figures of objects into a computer through a personal computer, an interactive Numerical Control (abbreviated NC) system or the like.

2. Description of the Prior Art

A typical example of method for inputting data representing a two-dimensional figure into a computer has heretofore been a "description input process using a predetermined language". This input process comprises a step of describing connections between elements of a two-dimensional figure by using a predetermined language and that of inputting such descriptions into a computer. A typical example of such an input process is APT (Automatically Programmed Tools).

However, this "two-dimensional figure input method using a predetermined language" is disadvantageous in that since the operator has to image a two-dimensional figure to himself and describe the figure by using the predetermined language on the basis of given figures and so forth, the conversion of the three-dimensional figure to the language is very cumbersome.

The present invention is intended to solve the above problem. Therefore, it is an object of the present invention to provide a graphics input apparatus which can recognize a three-dimensional shape intended by the operator simply by receiving a two-dimensional shape handwritten by him.

Furthermore, typical examples of methods for inputting data representing three-dimensional figures into a computer have been heretofore developed are an "input method using primitives" and a "description input method using predetermined (graphics input) language". In the "input method using primitives", a column, a cube and the like are registered as primitives. The primitives are put together by performing a set of operations such as sum, product and difference so as to make a complicated three-dimensional figure. In the description input method using a predetermined language, the relationship among an edge, a node and a plane of three-dimensional figure is described in the predetermined language and inputted into a computer. The three-dimensional graphic data processing are described in various literatures, for example, and article entitled "Study of Three-Dimensional Graphic Processing and Graphic Modeling Technique" (pp. 24–35, published by JOHO SHORI SHINKO JIGYO KYOKAI GIJUTSU CENTER in February, 1983).

However, the input method using primitives is disadvantageous in that since dimensional data is always required for making a figure, it is impossible to input only information on phases of graphic symbols and so on.

The description input method using a predetermined language such as APT makes it possible to input only information on phases of graphic symbols and so on and is fully flexible. However, this method is disadvantageous in that the operator has to image a figure to himself or use given drawings to describe a figure in the predetermined language. In this method, it is cumbersome for the operator to convert the intended three-dimensional figure to the representation in the predetermined language.

The present invention is intended to solve these problems. It is therefore an object of the present invention to provide a graphics input apparatus which enables the operator to input data representing a schematic shape of a three-dimensional form only by causing the operator to hand-write the three-dimensional figure on a two-dimensional screen of a CRT display.

SUMMARY OF THE INVENTION

To achieve the foregoing object and in accordance with a first aspect of the present invention, a graphics input apparatus is provided which comprises display device means capable of displaying a figure in a picture plane having $M \times N$ pixels (that is, picture elements), position indicating means for indicating predetermined positions in a picture plane of the display device means, cursor displaying means for displaying a cursor at the positions indicated by the position indicating means, element inputting means for executing a first step of displaying at the display position of the cursor a starting point of elements forming a shape to be drawn in the picture plane of the display device means as a starting node, a second step of storing in memory means a node number of a node to which the specified node number has been already assigned if such a node is present in the vicinity of the starting node, or of assigning a specified node number to a node if there are no nodes already assigned a specified node number in the vicinity of the starting node and storing the specified node numbers in the memory means, a third step of displaying the pixels at the display positions to which the cursor is moved by the position indicating means from the starting node as an element of the shape, a fourth step of displaying at the display position of the cursor an ending point of the element as an ending node, a fifth step of storing a node number of a node if such a node to which the specified node number has been already assigned is present in the vicinity of the ending node, or of assigning a specified node number to a node if there are no nodes already assigned a specified node number is present in vicinity of the ending node, and a sixth step of storing information on the connection between the starting node and the ending node, and shape recognition means for recognizing the shape formed by the elements in a predetermined manner.

In the graphics input apparatus having the above configuration, the element input means displays the starting node of the elements forming the shape at the position in the picture plane of the display device means corresponding to the position indicated by the position indicating means. The node number of the starting node is stored in the memory means. The position to which the cursor being moved by the position indicating means from the starting node is displayed as an element in the picture plane of the display device means. The ending node of the element is displayed at the position in the picture plane of the display device means corresponding to the position indicated by the position indicating means. The information on the connection between the starting node and the ending node is stored in the memory means. The shape recognition means recognizes the elements of the shape displayed in the picture plane in a predetermined manner, modifies the elements on the basis of the above recognition, and displays the thus modified elements in the picture plane.

In accordance with a second aspect of the present invention, a graphics input apparatus is provided which comprises display device means capable of displaying a figure in a picture plane having $M \times N$ pixels, positions indicating means for indicating predetermined positions in a picture plane of the display device means, a cursor displaying means for displaying a cursor at the positions indicated by the position indicating means, inter-node connection inputting means for executing a first step of displaying at the display position of the cursor one end of edges to be drawn on the picture plane as a node, a second step of storing in memory means a specified node number to a node if such a node to which the specified number has been already assigned is present in the vicinity of the node, or, of assigning a specified node number to a node if there are no nodes each of which a specified number have been already assigned to in the vicinity of the node and storing the node number of the node in the memory means, a third step of displaying the pixels at the positions to which the cursor is moved from the node indicated by the position indicating means as an edge and also assigning specified numbers to the edge and storing an edge number of the edge to which the specified number has been already assigned in the memory means, a fourth step of displaying at the display position of the cursor the other end of the edges as a node, a fifth step of storing the node numbers of the predetermined nodes if such nodes as already numbered are present in the vicinity of the node, or of assigning a specified node number to a node if no nodes already numbered are present in the vicinity of the node and storing the node number of the node in the memory means, and a sixth step of storing information on the connection between the nodes in the second step and the nodes in the fifth step, and means for storing graphic data of faces defined by the nodes and edges, the number of the nodes, and the number of edges as information on the faces.

Thus, a graphics input apparatus is further provided with means for storing graphic data on the faces formed by the nodes and edges and also storing the number of the nodes and the edges forming the faces as information about the face.

In accordance with a third aspect of the present invention, a graphics input apparatus is provided which comprises display device means capable of displaying a shape in a picture plane having $M \times N$ pixels, position indicating means for indicating predetermined positions in the picture plane of the display device means, cursor displaying means for displaying a cursor at the positions indicated by the position indicating means, inter-node connection inputting means for executing a first step of displaying at the display position of the cursor one end of edges to be drawn in the picture plane as a first node, a second step of storing in memory means a specified node number to a second node to which a specified number has been already assigned if such a node is present in the vicinity of the first node, or, of assigning a specified node number to a second node if there are no nodes already specifically numbered in the vicinity of the first node and storing the assigned node number of the node in the memory means, a third step of displaying the pixels at the positions to which the cursor is moved from the second node by the position indicating means as an edge and also assigning specified numbers to the edges and storing the edge number of the edges to which being already assigned the specified numbers in the memory means, a fourth step of displaying at the display position of the cursor the other end of the edges as a third node, a fifth step of assigning the specified node number to a fourth node if such a node as already specifically numbered is present in the vicinity of the third node, or of assigning a specified node number to a fifth node if no registered or specifically numbered node is present in the vicinity of the third node and storing the node numbers of the nodes already specifically numbered in the memory means, and a sixth step of storing information on the connection between the nodes in the second step and the nodes in the fifth step, and "face information" storing means for executing a seventh step of calculating trees, an eighth step of adding one corresponding branch to each of the trees to calculate each loop, a ninth step of storing the loops as faces, and a tenth step of storing the node numbers of the nodes and the number of the edges as information about the faces.

In the graphics input apparatus thus arranged, the inter-node connection input means displays nodes of edges at the positions in the display picture corresponding to the position indicated by the position indicating means. The node number of the node are stored in the memory means. The positions of the cursor moved from the node by the position indicating means is displayed as edges. The nodes of edges are displayed on the positions in the display picture corresponding to the position indicated by the position indicating means. The node number of these nodes are stored in the memory means. The information about the connection between the nodes is also stored in the memory means.

The "face information" storing means obtains information about the faces on the basis of the information on the inter-node connection stored in the memory means and stores it.

BRIEF DESCRIPTION OF THE DRAWING

The foregoing objects and advantages and other more specific objects will be apparent to those skilled in the art when proceeding through the following detailed description of illustrated embodiments of the invention, particularly when considered in connection with the accompanying drawings in which:

FIG. 4 is a diagram for illustrating the contents stored in a main memory;

DESCRIPTION OF PREFERRED EMBODIMENTS:

The present invention will further illustrated by giving a preferred embodiment thereof with reference to the accompanying drawings.

Figure 1:
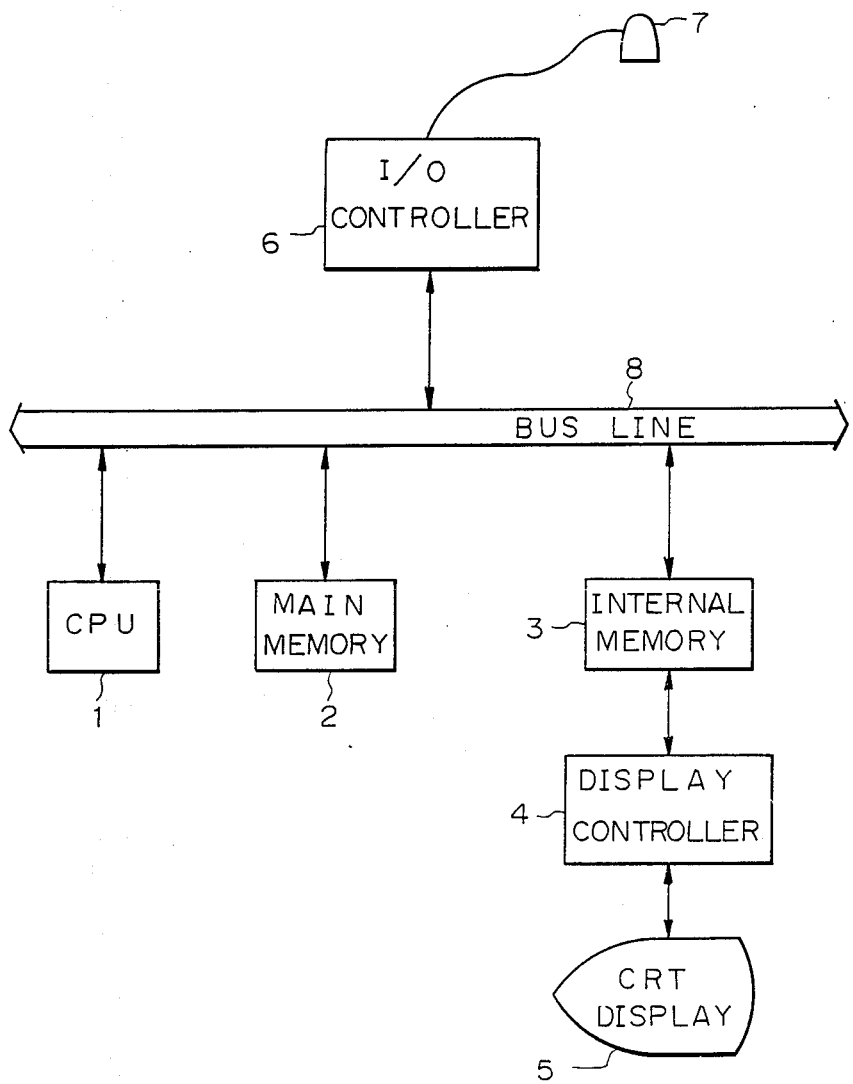
FIG. 1 is a block diagram of a graphics input apparatus according to the present invention.

FIG. 1 is a block diagram of a graphics input apparatus of the present invention. Referred to this figure, reference numeral 1 designates a central processing unit (hereinafter referred to simply as "CPU"). Further, reference numerals 2, 3, 4, 5, 6, 7, and 8 indicate a main memory, an internal memory of a display unit, a display controller, a CRT display, an input/output controller, a mouse, and a bus line, respectively.

CPU 1 operates in accordance with programs stored in the main memory 2. CPU 1 and the display controller 4 make the display memory 3 accessible via the bus line 8 so that data written by CPU 1 in the memory 3 is read by the display controller 4 and displayed on the screen of the CRT display 5. The mouse 7 is controlled by the input/output controller 6. Coordinate data and key input data outputted by the mouse 7 are inputted into CPU 1 via the input/output controller 6. Furthermore, the display controller 4 uses these data to display a cursor on the CRT display 5 depending on the position of the mouse 7.

(I) The overall operation of the graphics input apparatus of the present invention will be described in detail hereinafter with reference to the flow chart shown in FIG. 2.

(I-1) First Process (Steps 21-22)

CPU 1 causes the display controller 4 to erase a dot pattern on the screen of the CRT display 5 (Step 21) and waits for data input by use of the mouse 7 (Step 22).

(I-2) Second Process (Steps 23-26)

Whenever there is any data input from the mouse 7, CPU 1 displays at the display position of the cursor the starting node indicating the starting point of the elements making the shape to be displayed on the screen of the CRT display 5 (Step 23) and also determines whether the ending node or the ending node indicating the starting point of the shape is present in the vicinity of the display position of the cursor (Step 24). Whenever any node is present in the vicinity of the display position of the cursor, CPU 1 stores the node number and the coordinates thereof (Step 26). On the contrary, if no node is present in the vicinity of the display position of the cursor, the inputted position on the screen of the CRT display 5 is regarded as a new node to which a specified node number is assigned, and this node number and the coordinates thereof are stored steps 25 and 26).

(I-3) Third Process (Steps 27-31)

Figure 3:
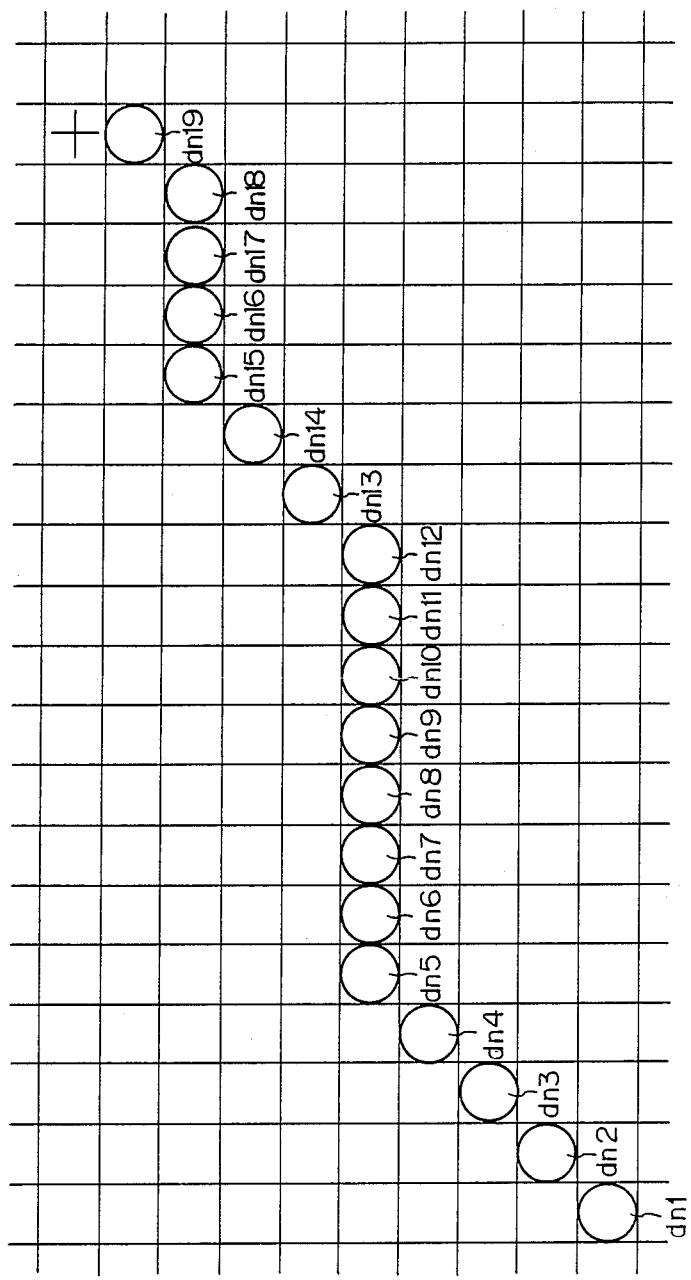
FIG. 3 is a diagram for illustrating a locus of cursor movement.

CPU 1 causes the display controller 4 to display a dot pattern on the screen of the display 5 (Step 27). CPU 1 waits for data input from the mouse 7 (Step 28). Whenever the operator works the mouse 7, CPU 1 moves the cursor to a position corresponding to that of the mouse 7, and causes the positions of the cursor to be displayed on the CRT display 5 (Step 29) as elements of the shape as shown in FIG. 3. The coordinates of the positions at which the cursor is displayed are stored (step 30). Furthermore, CPU 1 repeats Steps 28 to 30 until the input processing is completed (Step 31). The main memory 2 stores the positions of the cursor during this period of time. FIG. 4 is a diagram illustrating the contents stored in the main memory 2. As is seen from this figure, the main memory 2 stores the coordinates of the starting node dn1, the positions of the cursor (, that is, positions of pixels, forming the elements of the shape) dn2–dn18 and the ending node dn19 (x1, y1), (x2, y2), (x3, y3), (x4, y4), (x5, y5), (x6, y6), (x7, y7), (x8, y8), (x9, y9), (x19, y19), (x11, y11), (x12, y12), (x13, y13), (x14, y14), (x15, y15), (x16, y16), (x17, y17), (x18, y18), and (x19, y19).

(I-4) Fourth Process (Steps 32-34)

CPU 1 causes the display controller 4 to erase the dot pattern on the screen of the display 5 (Step 32) and waits for data inputted from the mouth 7. Whenever there is any data input by the mouse 7, CPU 1 displays the ending node of the elements on the display position of the cursor (Step 34).

(I-5) Fifth Process (Steps 35-37)

CPU 1 determines if the starting node or the ending node is present in the vicinity of the display position of the cursor (Step 35). If any node is present in the vicinity of the display position of the cursor, CPU 1 makes the memory 2 store the node number and the coordinates thereof (Step 37). If no node is present in the vicinity of the display position of the cursor, the position on the screen of the CRT display 5 which is regarded as a new node then numbered (Step 36). The node number and the coordinates thereof are stored (Step 37).

(I-6) Sixth Process (Step 38)

CPU 1 makes the memory store the connection between the starting node stored in Step 26 and the ending node stored in Step 36.

(II) Furthermore, CPU 1 recognizes the shape of the elements on the basis of the contents stored in the memory 2 by various methods described hereinafter.

(II-a) A 1st method for recognizing the shape of the elements.

Figure 5:
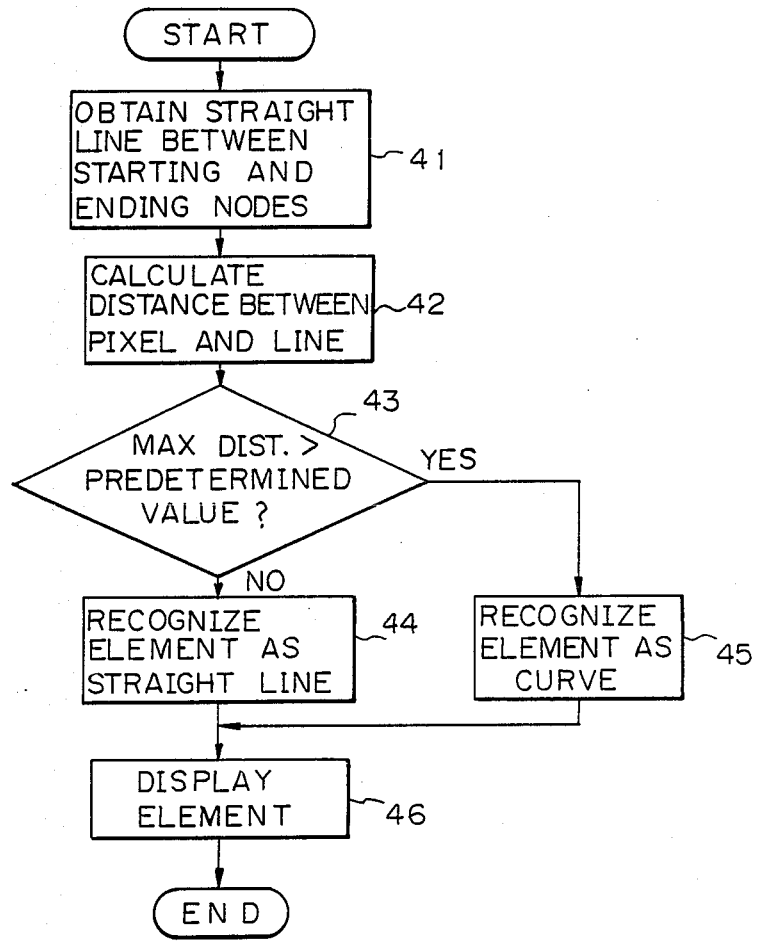
FIGS. 5, 8, 10, 12, 13, 15 and 16 are flow charts for illustrating 1st, 2nd, 3rd, 4th, 5th, 6th and 7th methods for recognizing shapes of the elements, respectively.
Figure 6A:
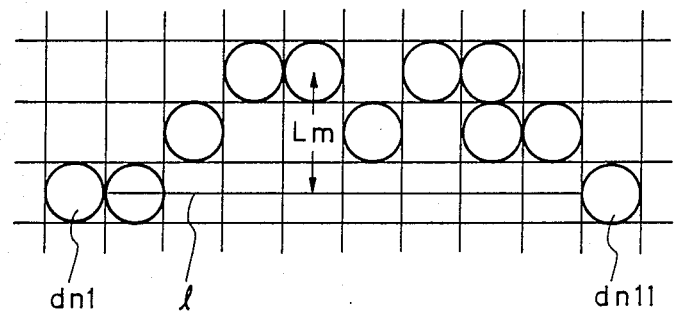
FIGS. 6(a), 6(b), 9, 11, 14(a), 14(b), and 17 are diagrams for illustrating 1st, 2nd, 3rd, 5th, 6th and 7th methods for recognizing the shapes of the elements, respectively.
Figure 6B:
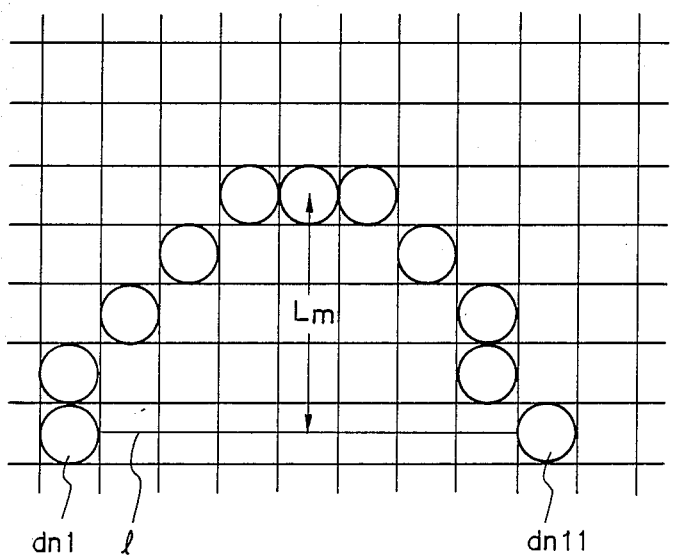

FIG. 5 is a flow chart for illustrating a 1st method for recognizing the shape of the element. FIGS. 6(a) and 6(b) are diagrams for recognizing the shape of the elements.

(II-a.1) Seventh Process (Step 41)

CPU 1 calculates data concerning to a straight line between the starting node dn1 and the ending node dn11 shown in FIGS. 6(a), 6(b).

(II-a.2) Eighth Process (Steps 42-45)

CPU 1 calculates the shortest distance between the display position of the pixel of the element and the straight line (Step 42), and compares the maximum value Lm of the distances thus calculated with the predetermined distance Ls (Step 43) to recognize that the element is in the form of a straight line as shown in FIG. 6(a) if Lm is Ls or less (Step 44) or that the element is in the form of a curve as shown in FIG. 6(b) if Lm is Ls or more (Step 45).

When CPU 1 draws the elements in the third process, different colors may be used for different display positions so that the elements can be recognized by the kind of color of displayed pixels.

CPU 1 may distinguish the kind of colors of the recognized elements in order to indicate that the elements have been recognized.

Alternately, CPU 1 may display symbols in the vicinity of the recognized element in order to know that the elements have been recognized.

Furthermore, CPU 1 urges the operator to input dimensional parameters required for the thus recognized elements. When the operator inputs dimensional parameters, CPU 1 displays the thus inputted dimensions in the vicinity of the elements on the screen. In this case, CPU 1 lets the operator know for what elements it urges the operator to input a value of a dimension by varying the kind of color of the elements.

Figure 7:
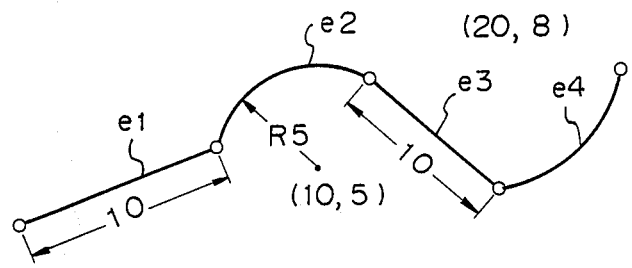
FIG. 7 is a diagram for illustrating a method for inputting a dimension of a radius.

FIG. 7 is a diagram for illustrating a method of inputting a dimension of a radius. In FIG. 7, an element e1, the length 10 of the element e1, an element e2, central coordinates (10, 5) and a radius R5 of the element e2, an element e3, the length 10 of the element e3, and an element e4 and central coordinates (20, 8) of the element e4 have been already inputted. When the central coordinates of the element e4 are inputted, CPU 1 causes the CRT display 5 to display a message "Input a dimension of a radius" to urge the operator to input data. The operator moves the cursor to the vicinity of the element e4 a dimension of which being to be inputted and inputs the value of the radius of an element by using ten-keys (not shown). Since CPU 1 has recognized the elements, it can easily recognize what dimension of the elements is to be inputted. CPU 1 can also recognize a straight line as a horizontal line or vertical line.

(II-a.3) Ninth Process (Step 46)

CPU 1 deletes the elements inputted in accordance with the coordinates of each pixel of the elements stored in the main memory 2 and displays the recognized straight line or curve as an element.

(II-b) A 2nd method for recognizing the shapes of the elements

Figure 9:
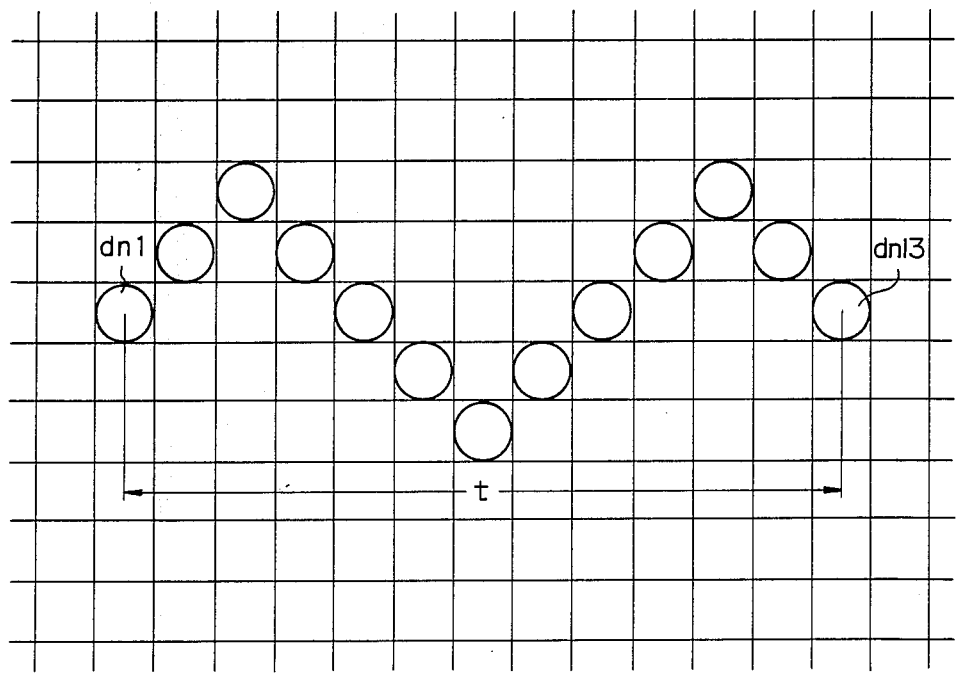
Figure 8:
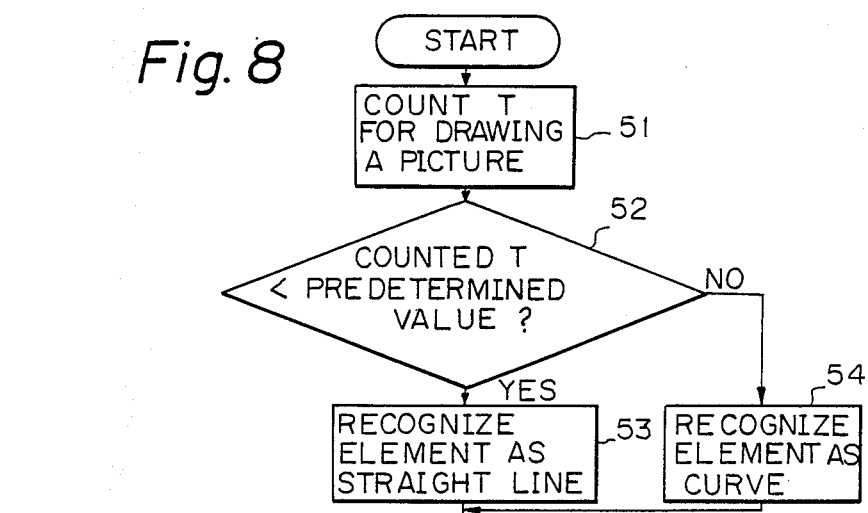

FIG. 8 is a flow chart for illustrating 2nd method for recognizing the shapes of the elements. FIG. 9 is a diagram for illustrating 2nd method for recognizing the shapes of the elements.

(II-b.1) Tenth Process (Step 51)

CPU 1 counts a period t of time required for the elements to be drawn from the starting node dn1 to the ending node dn13 as shown in FIG. 9.

(II-b.2) Eleventh Process (Steps 52-54)

CPU 1 compares the counted period t of time to a predetermined period $t_s$ of time. If t is shorter than or equal to $t_s$ CPU 1 determines that the element is a straight line (Step 53). If t is longer than $t_s$, CPU 1 determines that the element is a curve (Step 54).

(II-c) A 3rd method for recognizing the shape of the elements.

Figure 10:
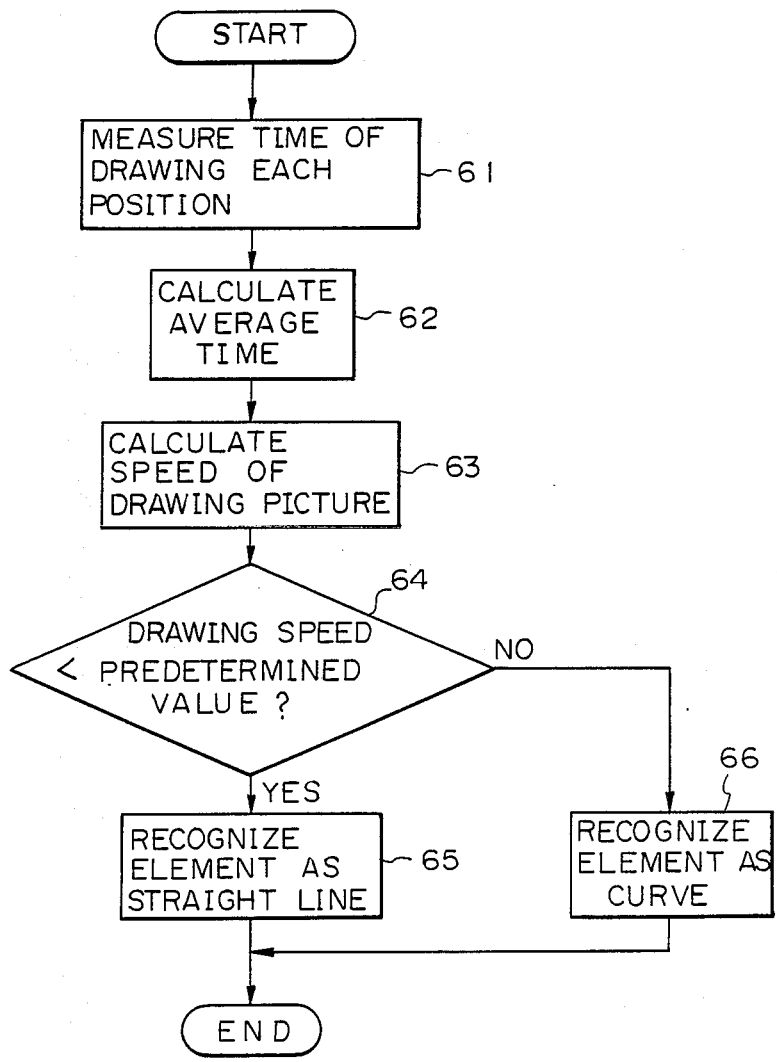
Figure 11:
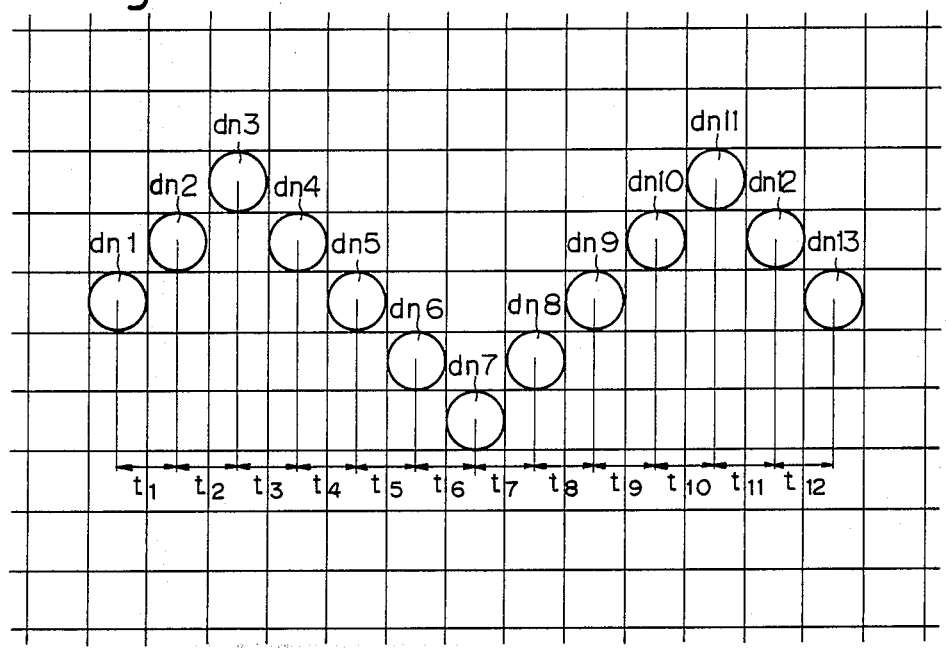

FIG. 10 is a flow chart for illustrating the 3rd method for recognizing the shapes of the elements. FIG. 11 is a diagram for illustrating the 3rd method for recognizing the shapes of the elements.

(II-c.1) Twelfth Process (Step 61)

After displaying the starting node dn1, CPU 1 counts a period $t_1$ of time which passes until the position dn2 of cursor is displayed. Thereafter, CPU 1 then counts a period $t_2$ of time which passes until the position dn3 of the cursor is displayed. CPU 1 further counts periods $t_3$, ..., $t_{12}$ in a similar manner. After displaying the position dn12, CPU 1 then counts a period $t_{12}$ of time which passes until the ending node dn13 is displayed.

(II-c.2) Thirteenth Process (Steps 62-63)

CPU 1 takes an average of the counted periods $t_1$, $t_2$, ..., $t_{12}$ of times to calculate an average time t (Step 62). CPU 1 then divides the total number of the pixels forming the element (13 pixels) by the average time t to calculate the drawing speed v (Step 63).

(II-c.3) Fourteenth Process (Steps 64-66)

CPU 1 compares the calculated drawing speed v to a predetermined speed $v_s$ (Step 64). If v is higher than $v_s$, CPU 1 recognizes the element as a curve (Step 66).

(II-d) A 4th method for recognizing the shape of the elements

Figure 12:
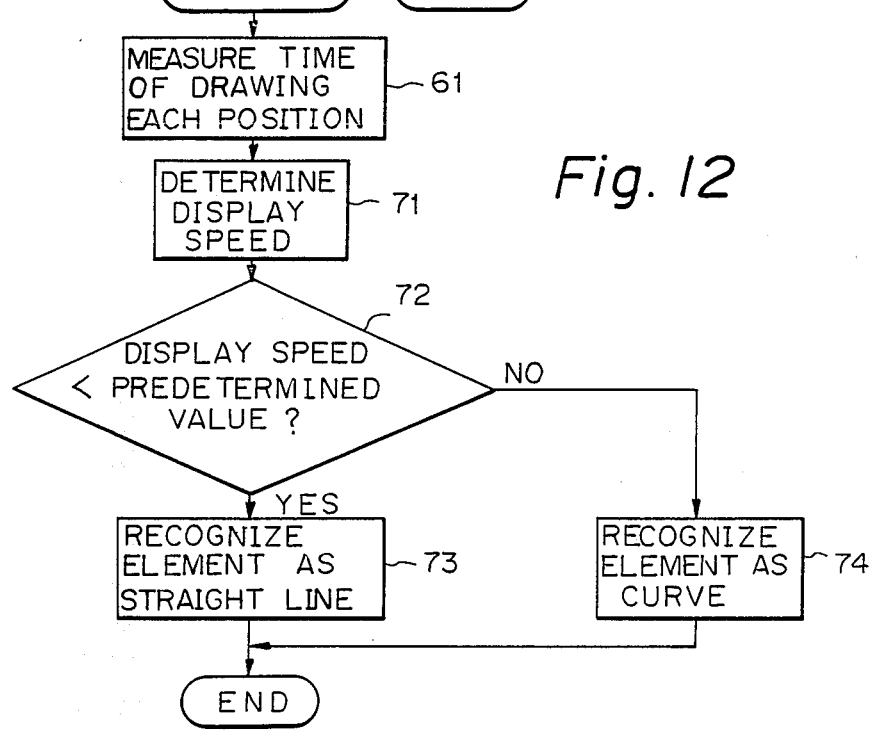

FIG. 12 is a flow chart for illustrating the 4th method for recognizing the shapes of the elements.

(II-d.1) Twelfth Process (Step 61)

CPU 1 displays the starting node dn1. Further, CPU 1 displays time $t_1$ which passes until the position dn2 of the cursor is displayed. CPU 1 further counts times $t_2$, ..., $t_{12}$ and $t_{13}$ in the same manner as above described in the subsection (II-c.1) with reference to FIG. 11.

(II-d.2) Fifteenth Process (Step 71)

CPU 1 determines the longest one of the counted times t1, t2, ... t12 to be the drawing speed v.

(II-d.3) Sixteenth Process (Steps 72-74)

CPU 1 compares the drawing speed v to the predetermined speed $v_s$ (Step 72). If v is higher than $v_s$, CPU 1 recognizes the element as a straight line (Step 73). If v is lower than $v_s$, CPU 1 recognizes the element as a curve (Step 74).

(II-e) A 5th method for recognizing the shape of the elements

Figure 13:
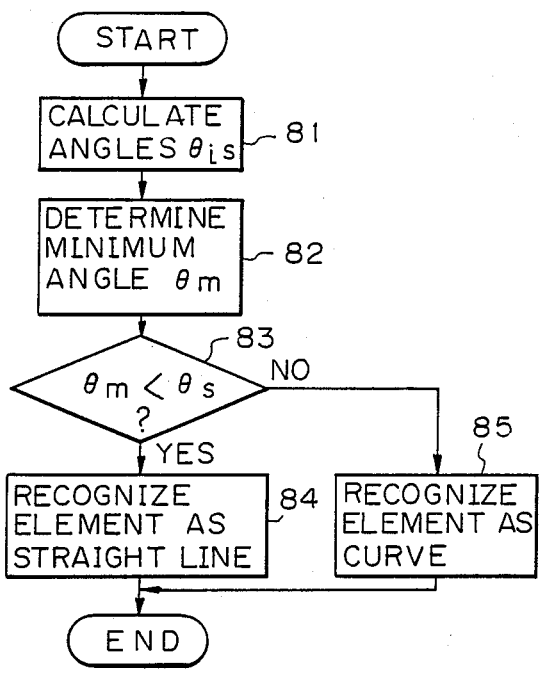

FIG. 13 is a flow chart for illustrating the 5th method for recognizing the shapes of the elements.

Figure 14A:
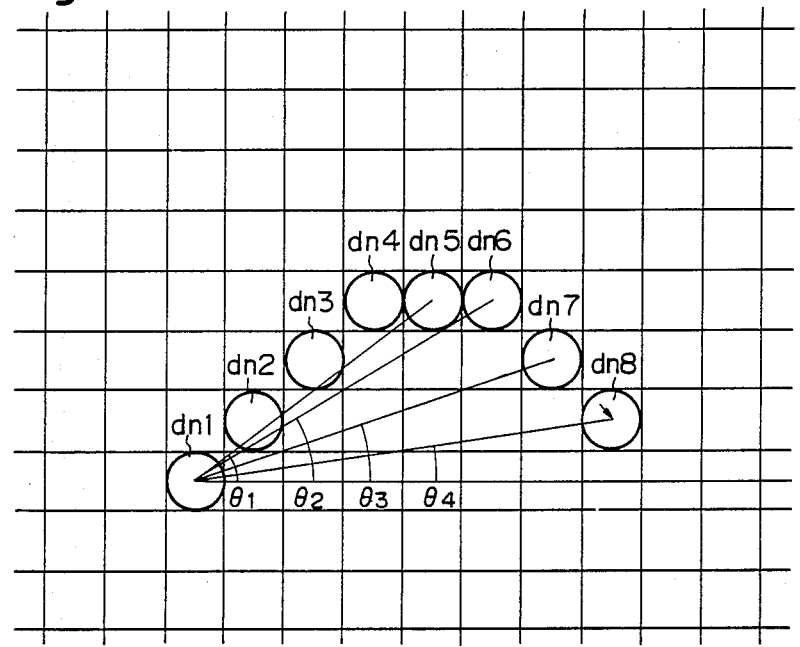

FIG. 14(a) is a diagram for illustrating the 5th method for recognizing the shapes of the elements.

(II-e.1) Seventeenth Process (Step 81)

CPU 1 calculates angles $\theta_1$, $\theta_2$, $\theta_3$ and $\theta_4$ formed by the horizontal straight line in the picture plane of the CRT display 5 passing through the starting node dn1 and the lines between the starting node dn1 and the position of the nodes dn5, dn6, dn7 and dn8 forming the element, respectively, in accordance with the positions of the cursor stored in Step 30 (see FIGS. 4 and 13).

(II-e.2) Eighteenth Process (Steps 82-85)

CPU 1 determines the minimum angle $\theta_m$ in the calculated angles $\theta_1$ to $\theta_4$ (Step 82) and further compares the angle $\theta_m$ to a predetermined angle $\theta_s$ (Step 83). If $\theta_m$ is smaller than $\theta_s$, CPU 1 recognizes the element as a straight line (Step 84). If $\theta_m$ is larger than $\theta_s$, CPU 1 recognizes the element as a curve (Step 85). It is not always required to store the position of each of pixels forming the element.

(II-f) A 6th method for recognizing the shape of the elements

Figure 15:
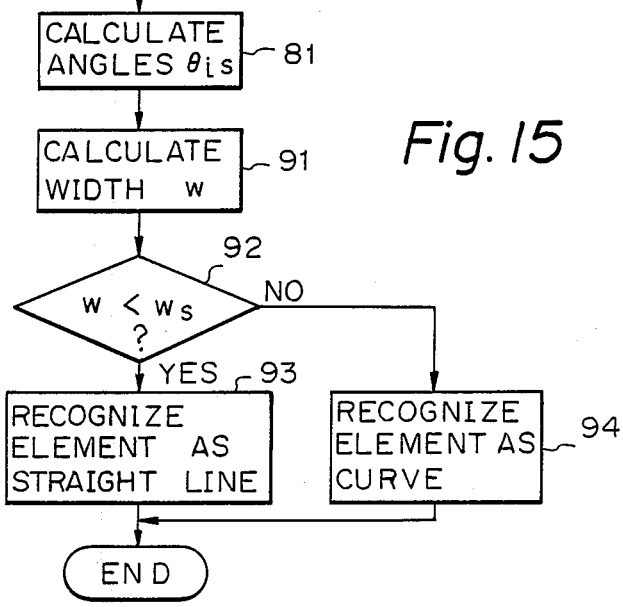

FIG. 15 is a flow chart for illustrating the 6th method for recognizing the shapes of the elements.

(II-f.1) Seventeenth Process (Step 81)

CPU 1 calculates angles $\theta_1$, $\theta_2$, $\theta_3$ and $\theta_4$ in the manner above described in the subsection (II-e.1).

(II-f.2) Nineteenth Process (Step 91)

Figure 14B:
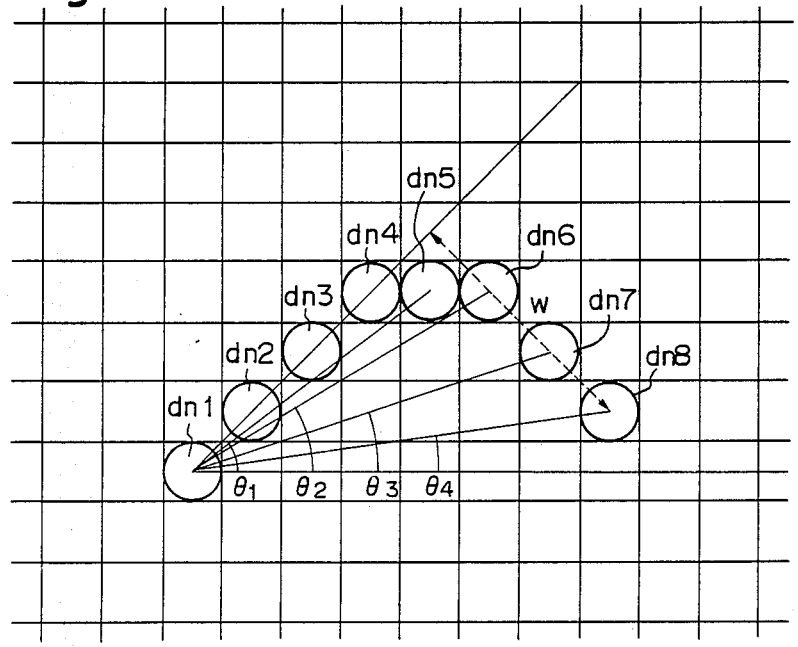

CPU 1 calculates a "width" w (shown in FIG. 14(b)) of the element from the minimum angle $\theta_m$ in the calculated angles $\theta_1$ to $\theta_9$.

(II-f.3) Twentieth Process (Steps 92-94)

CPU 1 compares the calculated width w to a predetermined width $w_s$ (Step 92). If w is smaller than $w_s$, CPU 1 recognizes the element as a straight line (Step 93). If w is larger than $w_s$, CPU 1 recognizes the element as a curve (Step 94). It is not always required to store the position of each of picture elements forming the element of the shape to be displayed.

(II-g) A 7th method for recognizing the shapes of the elements.

Figure 16:
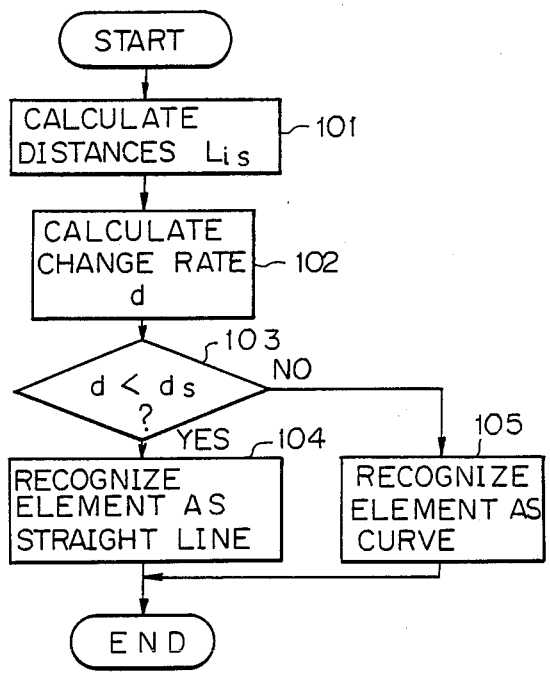

FIG. 16 is a flow chart for illustrating the 7th method for recognizing the shapes of the elements.

Figure 17:
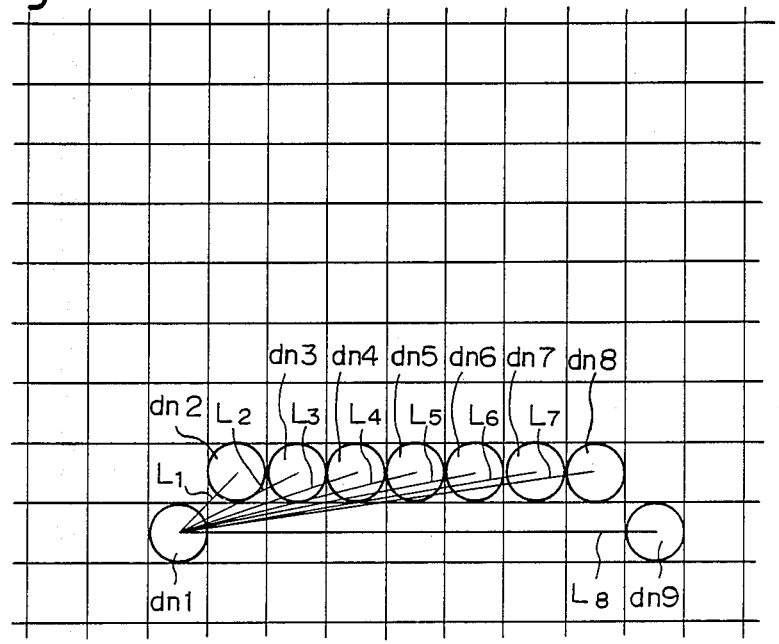

FIG. 17 is a diagram for illustrating 7th method for recognizing the shapes of the elements.

(II-g.1) Twenty-first Process (Step 101)

CPU 1 calculates the distances $L_1$, $L_2$, $L_3$, $L_4$, $L_5$, $L_6$, $L_7$ and $L_8$ between the starting node dn1 and the position dn2, dn3, dn4, dn5, dn6, dn7, dn8 and dn9 in accordance with the positions of the cursor stored in Step 30.

(II-g.2) Twenty-second Process (Step 102)

CPU 1 calculates a change rate d of the distances $L_1$ to $L_8$.

(II-g.3) Twenty-third Process (Steps 103-105)

CPU 1 compares the change rate d to a predetermined change rate $d_s$ (Step 103). If d is smaller than $d_s$, CPU 1 recognizes the element as a straight line (Step 104). If d is smaller than $d_s$, CPU 1 recognizes the element as a curve (Step 105).

Figure 18:
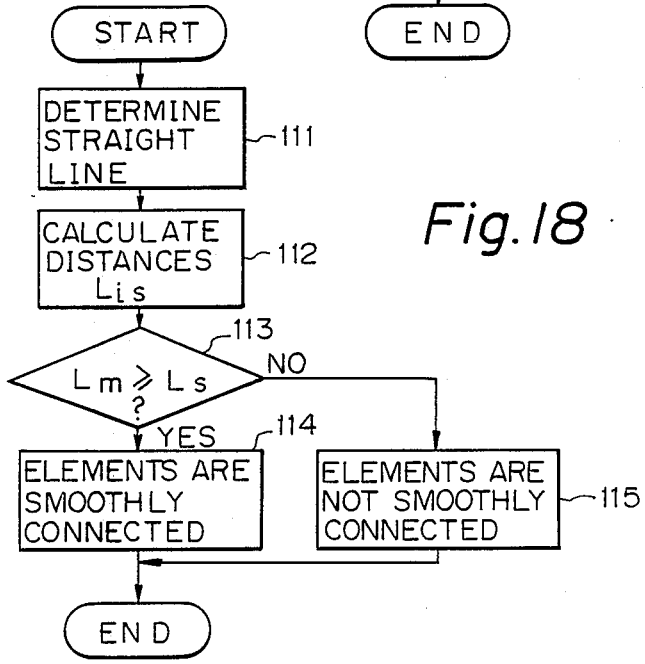
FIG. 18 is a flow chart for illustrating the processing in the case where the connection between one element of the shape to be displayed and another is recognized.
Figure 19:
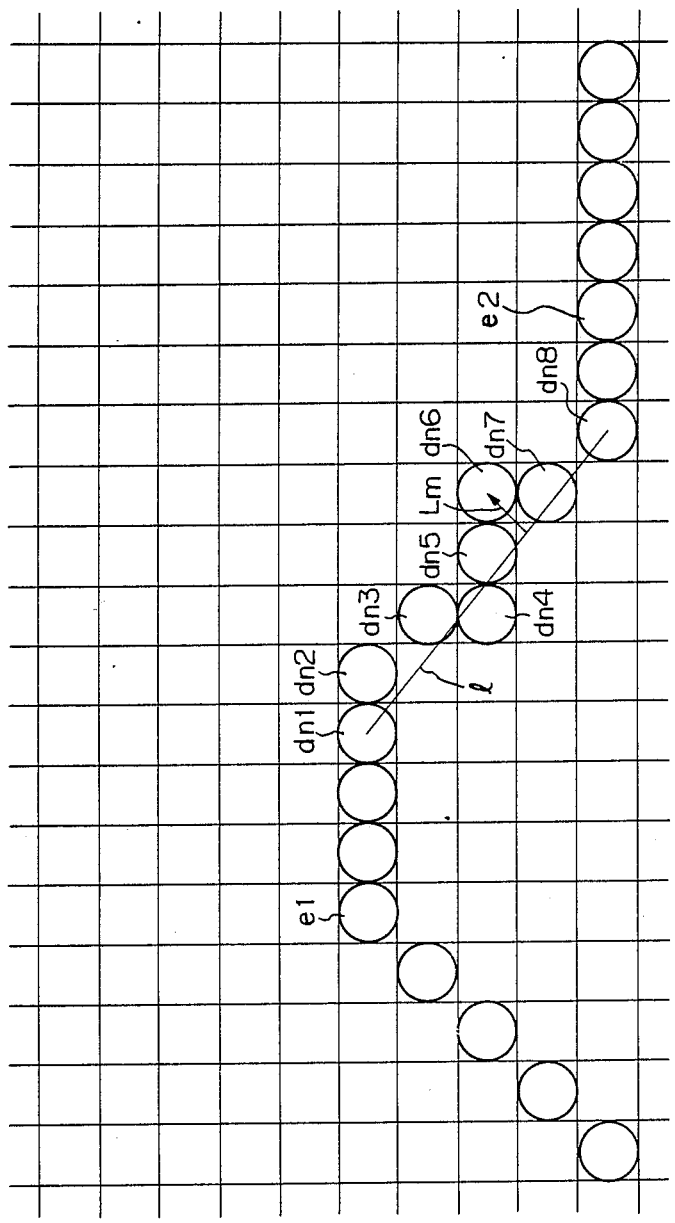
FIG. 19 is a diagram for illustrating the case where the connection between one element of a shape to be displayed and another is recognized.

(III) FIG. 18 is a flow chart for illustrating the processing in the case where the connection between one element of the shape to be displayed and another is recognized. FIG. 19 is a diagram showing the connected elements by way of example for illustrating the processing in such a case.

(III-1) Twenty-fourth Process (Step 111)

First CPU 1 determines the straight line segment between the pixel dn1 in the vicinity of the end of the element e1 and the picture element dn8 in the vicinity of the end of the element e2.

(III-2) Twenty-fifth Process (Steps 112-115)

CPU 1 calculates the distance from each of the positions dn2, dn3, dn4, dn5, dn6, dn7, and dn8 of the cursor in the vicinity of the connecting point of the two elements e1 and e2 to the straight line, respectively (Step 112). CPU 1 then compares the maximum distance $L_m$ in the calculated distances to a predetermined distance $L_s$ (Step 113). If $L_m$ is $L_s$ or less CPU 1 recognizes that the elements e1 and e2 are smoothly connected to each other (Step 114). If $L_m$ is $L_s$ or more, CPU 1 recognizes that the element e1 and the element e2 are not smoothly connected to each other (Step 115).

As above stated, in accordance with a first aspect of the present invention, the element input means displays the element at the predetermined positions on the screen of the display as indicated by the position indicating means, and the shape recognizing means recognizes the shapes of the elements in a predetermined manner. Therefore, the present invention can provide a graphics input apparatus which can recognize two-dimensional shapes extremely easily as compared to the "description input method using the predetermined language".

Next, another embodiment of the present invention will be further described with reference to the drawings.

First, a graphics input apparatus of this embodiment has the same construction that shown in FIG. 1. Thus, the description of construction of the graphics input apparatus is omitted hereon. Further, the overall operation of the graphics input apparatus of this embodiment will be described hereinafter. Input processing effected by using the graphics input apparatus of this embodiment comprises an input processing concerning to information about connection between nodes (Step 11) and another input processing of information about faces (Step 12) as shown in the flow chart of FIG. 20. First, processing of input data concerning to connection between nodes will be described with reference to the flow chart shown in FIG. 21. This input processing comprises a first process (Steps 121-122), a second process (Steps 123-126), a third process (Steps 127-130), a fourth process (Steps 131-133), a fifth process (Steps 134-136) and a sixth process (Step 137).

Figure 2:
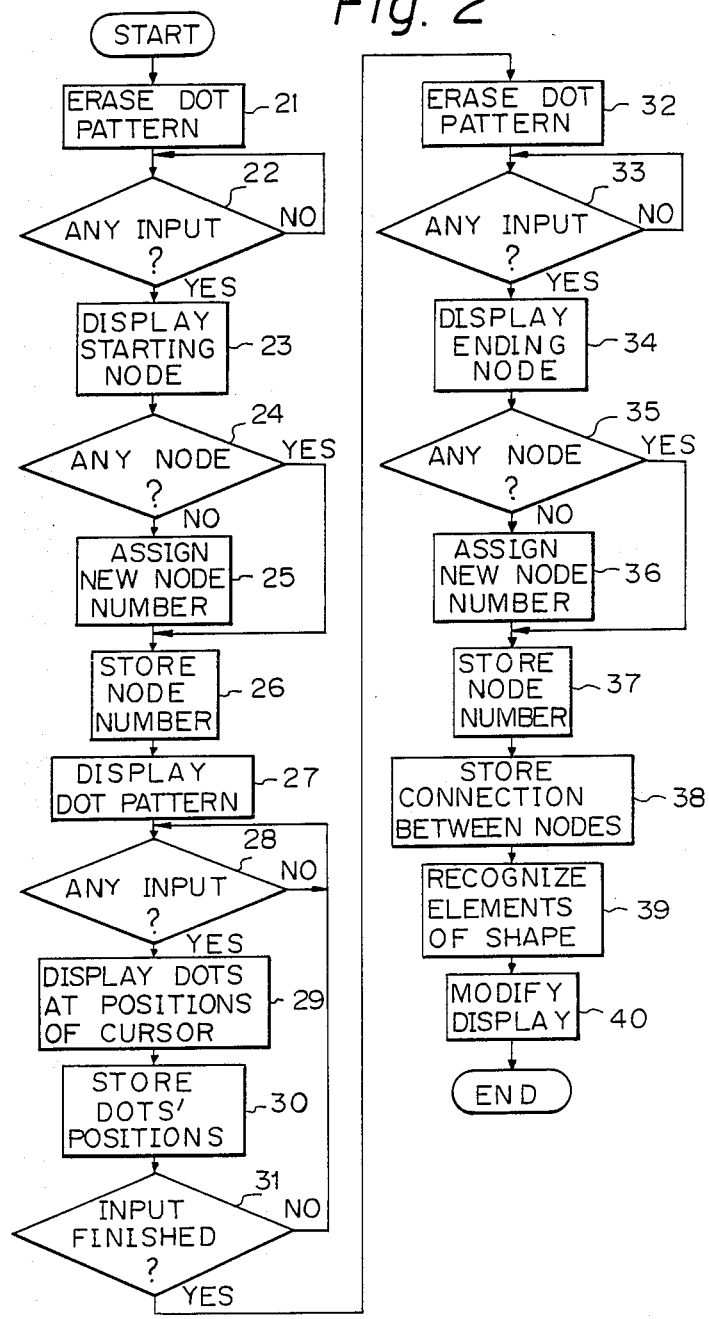
FIG. 2 is a flow chart illustrating the overall operation of a graphics input apparatus according to the present invention.

As is seen from this figure, operations performed at Steps 121-129 are the same with those at Steps 21-29 shown in FIG. 2.

Figure 21:
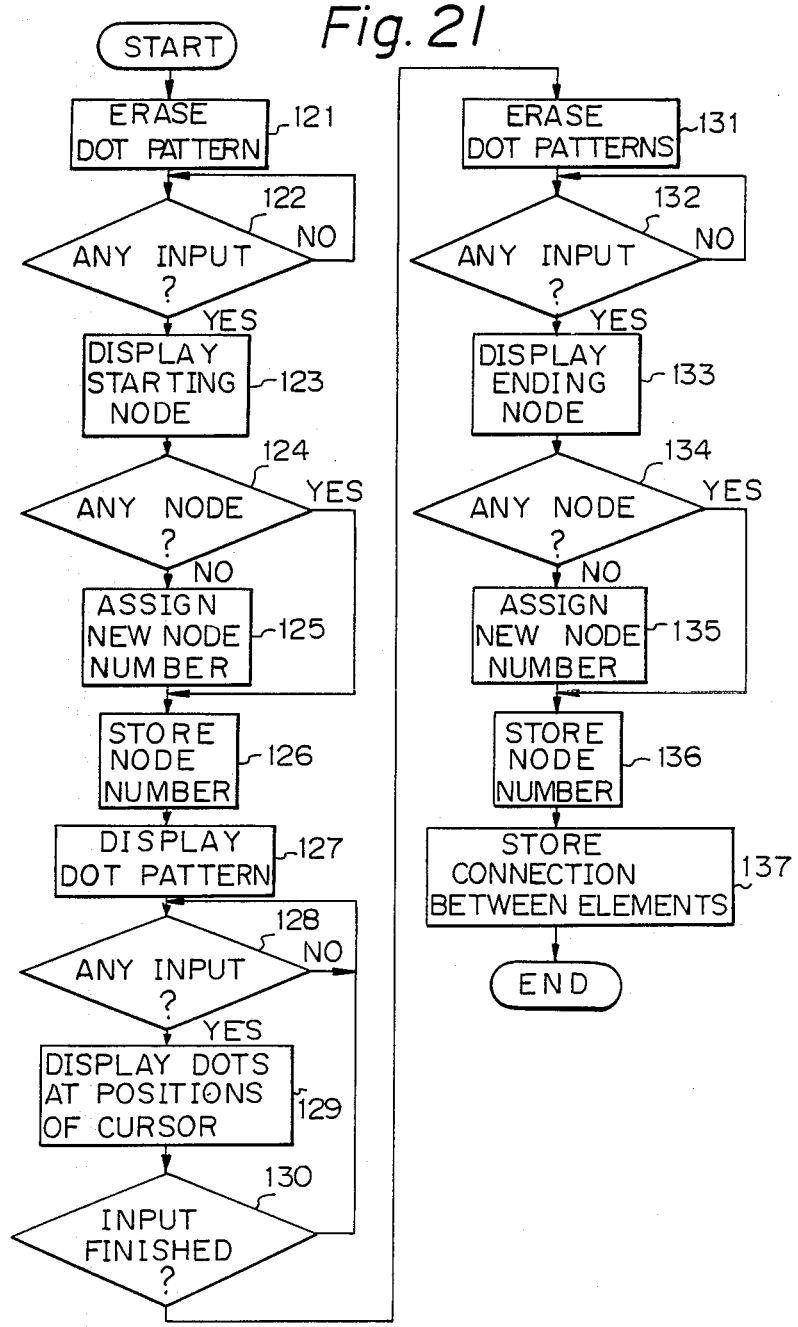
FIG. 21 is a flow chart of processing of inputting data concerning to connection between nodes.

Further, operations effected at Steps 130-137 are the same with those effeted at Steps 31-38, respectively. Thus, the detailed description of FIG. 21 is omitted hereon.

Figure 22:
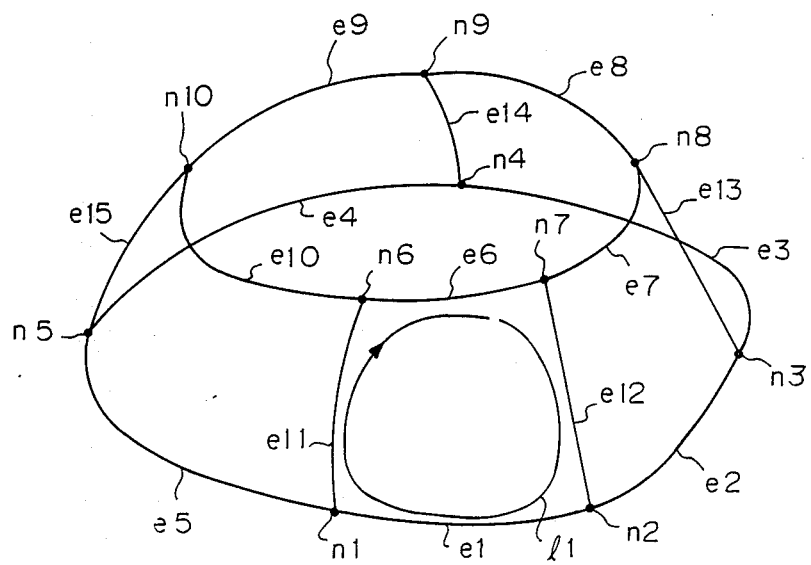
FIGS. 22 and 24 are diagrams for illustrating input of information about faces.

FIG. 22 is a diagram showing a picture displayed on the screen of the CRT display 5. In the above described operation, the picture of the CRT display 5 displays nodes n1, n2, n3, n4, n5, n6, n7, n8, n9, and n10, and edges e1, e2, e3, e4, e5, e6, e7, e8, e9, e10, e11, e12, e13, e14, and e15. The main memory 2 stores data indicating the connection between these nodes. An alternate method may be used which comprises a step of displaying the inter-node connection in the form of a straight line or curve when two nodes are selected.

Figure 20:
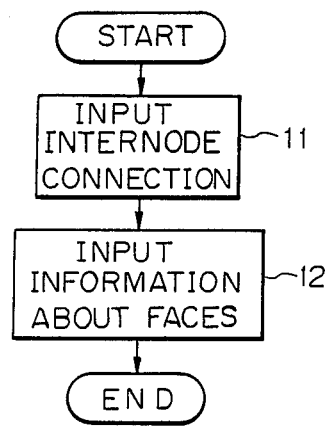
FIG. 20 is a flow chart for illustrating the overall operation of another graphics input apparatus embodying the present invention.

FIG. 20 is a flow chart for illustrating input processing of information about faces.

CPU 1 waits for input data keyed from the mouse 7. When the operator indicates a loop l1 running firstly from the node n1 to the node n6 via the edge e11 and secondly from the node n6 to the node n7 via the edge e6 and further from the node n7 to the node n2 via the edge e12, and returning from the node n2 to the node n1 via the edge e1 as shown in FIG. 22 by operating the mouse 7, CPU 1 makes the main memory 2 store the data concerning to the node n1, the edge e11, the node n6, the edge e6, the node n7, the edge e12, the node n2, the edge e1, and the node n1 as the information about the plane into the main memory 2. CPU 1 makes the main memory 2 store data of all faces of the figure displayed on the screen of the CRT display 5 by repeating the above described operations. Thus, the input of data concerning to connection between nodes (Step 11) and the input of data concerning to faces (Step 12) are properly effected so that all data concerning to phases of graphic symbols and so on are inputted data representing a three-dimensional figure. The data may be stored in the form of "winged edge" of general data structure.

Figure 23:
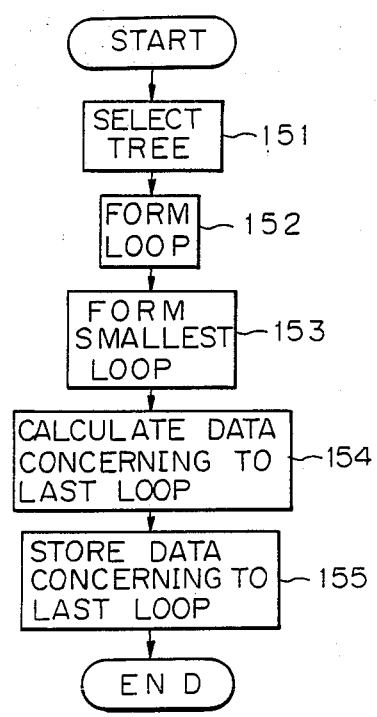
FIG. 23 is a flow chart for illustrating an operation of still another embodiment of the present invention.
Figure 24:
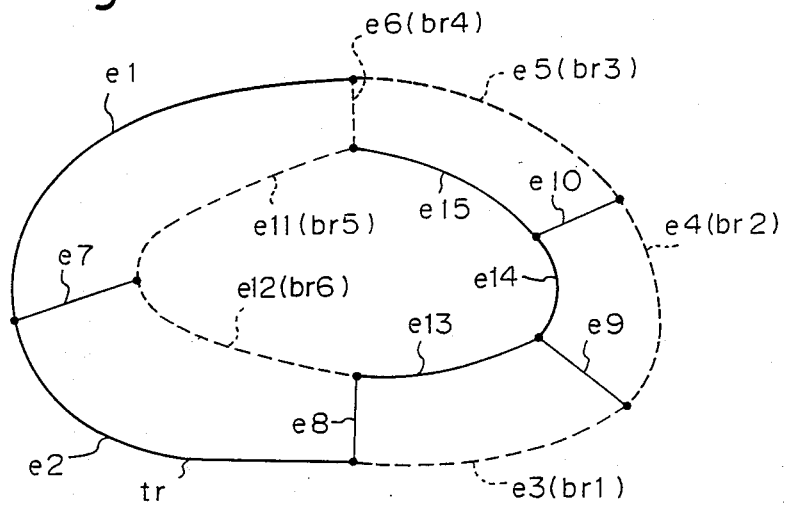

Next, FIG. 23 is a flow chart for illustrating an operation of still another graphics input apparatus embodying the present invention. FIG. 24 is a diagram illustrating the picture displayed on the screen of the CRT display 5. In this embodiment, the processing of input of data concerning to connection between nodes is similar to that of the above described embodiment and will not be further described herein.

(i) Alternative Seventh Process (Step 151)

CPU 1 selects one "tree" in graph theory on the basis of the inter-node connection stored in the main memory 2. That is, CPU 1 stores a "tree" tr consisting of the edges e1, e2, e7, e8, e9, e10, e13, e14 and e15.

(ii) Alternative Eighth Process (Step 152)

CPU 1 adds the edges e3, e4, e5, e6, e11 and e12 which do not belong to the "tree" tr, i.e. "branches" br1, br2, br3, br4, br5 and br6 to each "tree" tr to form six sets of loops.

(iii) Alternative Ninth Process (Steps 153-154)

Both of faces on these loops formed in Step 152 are EXCLUSIVE ORed by CPU 1 to form the smallest loop comprising the smallest element (Step 153). CPU 1 then provides directionality on the thus formed smallest loop to take the sum thereof so that data concerning to the last one loop is calculated (Step 154).

(iv) Alternative Tenth Process (Step 155)

CPU 1 makes the main memory 2 store data concerning to the last one loop and thus the last loop is stored as a face in the memory 2. The above described recognition method is a known method. In this process, planes can be automatically sampled. However, this procedure is disadvantageous in that the more complex a figure becomes, the longer is the time required to recognize the face.

With such an arrangement that when a node in the predetermined direction along the edge which is a border of planes is selected for each of all faces, the kind of color or line of the edge can be altered, the operator can monitor which face is selected.

If the kind of color or line of the edge has been altered before a node being present in the predetermined direction along the edge which being a border of other faces is selected in the above arrangement, the kind of color or line of the edge can be further altered so that the operator can easily know whether or not all planes have been selected.

In accordance with a second aspect of the present invention, the inter-node connection input means displays edges on the screen of the display in accordance with the result of the predetermined position on the screen by the position identification means, and the face data storing means stores data concerning to nodes and edges forming faces. Thus, the present invention can provide a graphics input apparatus which can input data of three-dimensional figure extremely easily as compared to the conventional "input method using primitives " or "description input processing method using a predetermined language".

While the invention has been particularly shown and described with reference to preferred embodiments thereof, it will be understood by those skilled in the art that changes and variations may be made in the invention without departing from the spirit and scope thereof.

What is claimed is:

1. A graphics input apparatus, which includes:
memory means;
display device means capable of displaying a figure in a picture plane having $m \times N$ pixels;
positions indicating means for indicating predetermined positions in the picture plane of said display device means;
cursor displaying means for displaying a cursor at the positions indicated by said position indicating means;
element inputting means for executing a first step of displaying at the display position of said cursor a starting point of elements forming the figure to be drawn in the picture plane of said display device means as a starting node, a second step of storing in said memory means a node number of a node if the numbered node is present in the vicinity of the starting node, or of assigning a specified node number to a node if there are no nodes already numbered present in the vicinity of the starting node and storing the specified node number in said memory means, a third step of displaying pixels at the display positions of said cursor indicated by said position indicating means from the position of the starting node as an element, a fourth step of displaying an ending point of the element at the display position of said cursor as an ending node, a fifth step of storing a node number of a node if the numbered node is present in the vicinity of the ending node, and of assigning and storing a specified node number to a node if there are no nodes already numbered present in the vicinity of the ending node, and a sixth step of storing information between the starting node and the ending node; and
shape recognition means for recognizing the shape of the element is a predetermined manner.

2. A graphics input apparatus as claimed in claim 1, wherein said element inputting means includes a position storing means for storing data concerning the positions of the elements of the figure in the picture plane to be displayed in said third step in sequence for every pixel and said shape recognizing means deletes the elements in order to provide modification of the elements in accordance with the contents of the storage in said position storing means and displays the modified elements in the picture plane of said display device means.

3. A graphics input apparatus as claimed in claim 1, wherein said shape recognizing means executes a seventh step of calculating data concerning a straight line between the position of said starting node and the position of said ending node and a eighth step of calculating the distances between said straight line and each of the pixels forming the element of the figure and of recognizing the element as a straight line if the maximum distance in the calculated distance is less than a predetermined distance, or, of recognizing the element as a curve if the maximum distance is equal to or more than the predetermined distance.

4. A graphics input apparatus as claimed in claim 1, wherein said shape recognizing means executes a seventh step of the calculating data concerning to a straight line between the position of the starting node and the position of the ending node, an eighth step of calculating, the distances between said straight line and each of the pixels forming the element of the figure and, of recognizing the element as a straight line if the maximum distance in the calculated distances is less than a predetermined distance, or of recognizing the element as a curve if the maximum distance in the calculated distance is more than or equal to the predetermined distance, and a ninth process for deleting the elements indicated by said position indicating means and displaying the straight line or curve recognized as the element on the basis of contents stored in said memory means if the maximum distance is equal to or more than the predetermined distance.

5. A graphics input apparatus as claimed in claim 1, wherein said element inputting means executes a tenth step of counting the time which passes until the element of the figure is drawn from the starting node to the ending node and said shape recognizing means executes an eleventh step of recognizing the element as a straight line if the counted time is shorter than a predetermined time, or of recognizing the element as a curve if the counted time is longer than the predetermined time.

6. A graphics input apparatus as claimed in claim 1, wherein said element inputting means executes a twelfth step of counting the time which passes from the display of a pixel of the element until the display of the next pixels of the elements and a thirteenth step of taking an average of the counted time and dividing the total number of pixels forming the element by the average time to calculate a drawing speed and said shape recognizing means executes a fourteenth step of recognizing the element as a straight line if the drawing speed is higher than predetermined speed, or of recognizing the element as a curve if the drawing speed is lower than the predetermined speed.

7. A graphics input apparatus as claimed in claim 1, wherein said element inputting means executes a twelfth step of counting the time which passes from the display of a pixel of the element until the display of the next pixel of the element and a fifteenth step for determining the longest time in the counted time to be a parameter depending on a drawing speed and said shape recognizing means executes a sixteenth step of recognizing the element as a straight line if the value of the parameter is higher than a predetermined value, or of recognizing the element as a curve if the value of the parameter is lower than said predetermined value.

8. A graphics input apparatus as claimed in claim 1, wherein said element inputting means includes a position storing means for storing the positions in the element of the figure displayed in said third step in sequence for every pixel and said shape recognizing means executes a seventeenth step of calculating angles defined by a straight line and each of lines between the starting node and pixels forming the element and an eighteenth step of recognizing the element as a straight line if the minimum angle in the calculated angles is smaller than predetermined angle, or of recognizing the element as a curve if the minimum angle is larger than said predetermined angle.

9. A graphics input apparatus as claimed in claim 1, wherein said element inputting means includes position storing means for storing the positions in the display of the element of the figure displayed in said third step in sequence for every pixel and said shape recognizing means executes a seventeenth step of calculating angles defined by segments between the starting node and the position of each of pixels forming the elements, a nineteenth step of calculating the width of the element on the basis of the calculated angles, and a twentieth step of, if the calculated width is smaller than a predetermined width, recognizing the element as a straight line, or of recognizing the element as a curve if the calculated width is larger than the predetermined width.

10. A graphics input apparatus as claimed in claim 1, wherein said element inputting means includes sample storing means for sampling the characteristics of the elements from the positions of pixels forming the elements and storing the sampled characteristics upon drawing of the elements and said shape recognizing means recognizes the elements on the basis of the contents stored in said sample storing means.

11. A graphics input apparatus as claimed in claim 10, wherein said shape recognizing means executes a seventeenth step of calculating and storing angles formed by the straight line passing through the starting node and each of segments between the starting node and the position of each of the pixels forming an element of a figure, a nineteenth step of calculating the width of the element on the basis of said calculated angles, and a twentieth step of recognizing the element as a straight line if the calculated width is smaller than the predetermined width, or of recognizing the element as a curve if the calculated width is larger than said predetermined width.

12. A graphics input apparatus as claimed in claim 10, wherein said shape recognizing means executes a twenty-first step of calculating and storing the distance between the starting node and each of pixels forming an element of the figure, a twenty-second step of calculating the change rate of the calculated distance, and a twenty-third step of recognizing the element as a straight line if said change rate is smaller than predetermined change rate, or of recognizing the element as a curve if the change rate is larger than the predetermined change rate.

13. A graphics input apparatus as claimed in claim 10, wherein said shape recognizing means executes a twenty-fourth step of calculating and storing data concerning to the straight line between the position of one pixel of the element and the position of one pixel of another element, the straight line being connected to the element and a twenty-fifth step of calculating the distance between the straight line and each of the pixels in the connection between two elements and, of recognizing that the two elements are smoothly connected to each other if the maximum distance in the calculated distances is less than a predetermined distance, or, of recognizing that the two elements are not smoothly connected to each other if the maximum distance is equal to or more than said predetermined distance.

14. A graphics input apparatus as claimed in claim 1, wherein said shape recognizing means include a means for distinguishing the kinds of colors of the recognized elements.

15. A graphics input apparatus as claimed in claim 1, wherein said shape recognizing means displays a message prompting an operator to input dimensional parameters required for the recognized elements.

16. A graphics input apparatus as claimed in claim 15, wherein said shape recognizing means displays the inputted dimensions in the vicinity of the element in the picture plane.

17. A graphics input apparatus as claimed in claim 15, wherein said element inputting means indicates an element, the dimensions of which an operator is prompted to input by showing said element in a kind of color, which kind is different from those of colors of other elements.

18. A graphics input apparatus, which includes:
memory means;
display device means capable of displaying a figure in a picture plane having $M \times N$ pixels, position indicating means for indicating predetermined positions in a picture plane of said display device means;
cursor displaying means for displaying a cursor at the positions indicated by said position indicating means;
inter-node connection inputting means for executing a first step of displaying at the display position of the cursor one end of an edge to be drawn in said picture plane as a node, a second step of storing in said memory means a specified node number of a numbered node if the numbered node is present in the vicinity of the end displayed as a node, or of assigning a specified node number to a node if there is no numbered node in the vicinity of the end displayed as a node and storing the node number of the end displayed as a node, a third step of displaying the pixels of the picture plane at the positions of the cursor moved from the end by said position indicating means as an edge and also assigning a specified edge number to said edges and storing the edge number of the numbered edges in said memory means, a fourth step of displaying at said display position of the cursor the other end of said edge as a node, a fifth step of assigning the node number of the predetermined node to a node if the numbered node is present in the vicinity of the other end displayed as a node, or of assigning a specified node number to another node and storing the specified node number in said memory means if no numbered node is present in the vicinity of the other end displayed as a node, and a sixth step of storing information on the connection between the node in said second step and the node in said fifth step; and means for storing data of faces defined by the nodes and edges, the number of the nodes, and the edge numbers of edges as information on the faces.

19. A graphics input apparatus as claimed in claim 18, wherein said inter-node connection inputting means, after selecting the node corresponding to one end of the edges, displays the pixels at the positions of the cursor moving in the picture plane until said inter-node connection inputting means selects the node corresponding to the other end of the edge.

20. A graphics input apparatus as claimed in claim 18, wherein, said inter-node connection inputting means draws a straight line or curve between both ends of an edge when both ends of the edge are selected.

21. A graphics input apparatus as claimed in claim 18, wherein said inter-node connection inputting means changes the kinds of colors or lines of the nodes and the edges forming the faces, data of which are stored.

22. A graphics input apparatus as claimed in claim 18, wherein said inter-node connection inputting means selects the different kind of color or line to show the nodes and edges forming a different one of the faces.

23. A graphics input apparatus, which includes:
memory means;
display device means capable of displaying a figure in a picture plane having M×N pixels;
position indicating means for indicating predetermined positions in the picture plane of said display device means;
cursor displaying means for displaying a cursor at the position indicated by said position indicating means;
inter-node connection inputting means for executing a first step of displaying at the display position of the cursor one end of edge to be drawn in the picture plane as a node, a second step of storing in said memory means a specified node number to a node to which the specified number has been already assigned is present in the vicinity of the one end displayed as a node, or of assigning a specified node number to a node if there is no numbered node in the vicinity of the one end displayed as a node and storing the node number of the node in said memory means, a third step of displaying said pixels in the picture plane at the position of the cursor moved from the one end of said position indicating means as an edge and also assigning a specified number to the edge and storing the edge number of the edges in said memory means, a fourth step of displaying at said display position of the cursor the other end of the edge as a node, a fifth step of assigning a node number of a numbered node to the node displayed in the fourth step if the numbered node is present in the vicinity of the other end displayed as a node, or of assigning a specified node number to the node displayed in the fourth step if numbered nodes are present in the vicinity of the displayed node and of storing the specified node number of the displayed node, and a sixth step of storing information on the connection between the node in said second step and the node in said fifth step; and means for executing a seventh step of calculating data of trees, an eighth step of adding one corresponding branch to each of the trees to calculate each loop, a ninth step of storing data of the loops as data of faces, and a tenth step of storing the number of the nodes and the number of said edges as data of the faces.

24. A graphics input apparatus as claimed in claim 23, wherein said inter-node connection inputting means, after selecting the node corresponding to one end of the edge, displays the position of the cursor moving in the picture plane until it selects the node corresponding to the other end of the edge.

25. A graphics input apparatus as claimed in claim 23, wherein when the nodes at both ends of the edges are selected, said inter-node connection inputting means draws a straight line or curve between the nodes at both the ends.

26. A graphics input apparatus as claimed in claim 23, wherein said inter-node connection input means changes the kinds of colors or lines of said nodes and said edges forming the stored faces.

27. A graphics input apparatus as claimed in claim 23, wherein said inter-node connection inputting means selects different kind of color or line to show the nodes and edges forming a different face stored in said memory means.

* * * * *